(12) United States Patent
He

(10) Patent No.: US 12,555,197 B2
(45) Date of Patent: Feb. 17, 2026

(54) SPLICING TARGET OBJECT FROM INPUT IMAGES TO TARGET TEMPLATE IMAGES

(71) Applicant: BEIJING ZITIAO NETWORK TECHNOLOGY CO., LTD., Beijing (CN)

(72) Inventor: Qian He, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 149 days.

(21) Appl. No.: 18/558,048

(22) PCT Filed: Apr. 14, 2022

(86) PCT No.: PCT/CN2022/086739
§ 371 (c)(1),
(2) Date: Oct. 30, 2023

(87) PCT Pub. No.: WO2022/233223
PCT Pub. Date: Nov. 10, 2022

(65) Prior Publication Data
US 2024/0221126 A1    Jul. 4, 2024

(30) Foreign Application Priority Data
May 7, 2021    (CN) .......................... 202110496619.6

(51) Int. Cl.
*G06T 5/50*    (2006.01)
*G06V 10/25*    (2022.01)
(Continued)

(52) U.S. Cl.
CPC ................ *G06T 5/50* (2013.01); *G06V 10/25* (2022.01); *G06V 10/44* (2022.01); *G06V 10/751* (2022.01);
(Continued)

(58) Field of Classification Search
None
See application file for complete search history.

(56) References Cited

U.S. PATENT DOCUMENTS

| | | | |
|---|---|---|---|
| 2003/0007687 A1 | 1/2003 | Nesterov et al. | |
| 2009/0116749 A1* | 5/2009 | Cristinacce | G06V 40/171 |
| | | | 382/209 |

(Continued)

FOREIGN PATENT DOCUMENTS

| | | | |
|---|---|---|---|
| CN | 104463081 A | | 3/2015 |
| CN | 105118082 A | * | 12/2015 |

(Continued)

OTHER PUBLICATIONS

Melacci S, Sarti L, Maggini M, Gori M. A template-based approach to automatic face enhancement. Pattern Analysis and Applications. Aug. 2010;13:289-300. (Year: 2010).*

(Continued)

*Primary Examiner* — Zhengxi Liu
(74) *Attorney, Agent, or Firm* — Astute IP Law Group

(57) ABSTRACT

Provided are an image splicing method, apparatus and device, and a medium. The image splicing method includes acquiring a to-be-spliced image and multiple template images, where the to-be-spliced image and each template image each include a target object; calculating a matching degree between the target object in the to-be-spliced image and the target object in the each template image; determining a template image whose matching degree satisfies a preset matching condition as a target template image; and splicing a target image portion in the to-be-spliced image to a target image region in the target template image to obtain a target spliced image, where the target image portion and the target image region correspond to the same portion of the target object.

19 Claims, 5 Drawing Sheets

(51) Int. Cl.
*G06V 10/44* (2022.01)
*G06V 10/75* (2022.01)

(52) U.S. Cl.
CPC .............. *G06T 2207/20221* (2013.01); *G06T 2207/30201* (2013.01)

(56) References Cited

U.S. PATENT DOCUMENTS

| | | | | |
|---|---|---|---|---|
| 2012/0257016 | A1* | 10/2012 | Nakajima | G06T 7/593 348/46 |
| 2021/0042558 | A1* | 2/2021 | Choi | G06F 18/2431 |
| 2021/0049350 | A1* | 2/2021 | Wu | G06V 10/443 |
| 2021/0049390 | A1* | 2/2021 | Wu | G06V 40/10 |
| 2022/0197639 | A1* | 6/2022 | Rasch | G06N 3/065 |

FOREIGN PATENT DOCUMENTS

| | | | | |
|---|---|---|---|---|
| CN | 107767330 | A | | 3/2018 |
| CN | 109559362 | A | | 4/2019 |
| CN | 110852221 | A | | 2/2020 |
| CN | 111008927 | A | | 4/2020 |
| CN | 111476710 | A | | 7/2020 |
| CN | 111861954 | A | | 10/2020 |
| CN | 112508777 | A | * | 3/2021 ............. G06F 18/22 |

OTHER PUBLICATIONS

Ng et al., "Columbia Image Splicing Detection Evaluation Dataset," archived on Jul. 11, 2007 at https://web.archive.org/web/20070711123124/https://www.ee.columbia.edu/In/dvmm/downloads/AuthSplicedDataSet/AuthSplicedDataSet.htm (Year: 2007).*

International Search Report (with English translation) and Written Opinion issued in PCT/CN2022/086739, dated Jun. 22, 2022, 9 pages provided.

Office Action for Chinese Patent Application No. 202110496619.6, mailed on Apr. 25, 2025, 23 pages.

* cited by examiner

SPLICING TARGET OBJECT FROM INPUT IMAGES TO TARGET TEMPLATE IMAGES

CROSS-REFERENCE TO RELATED APPLICATIONS

This is a National Stage Application, filed under 35 U.S.C. 371, of International Patent Application No. PCT/CN2022/086739, filed on Apr. 14, 2022, which claims priority to Chinese patent application No. 202110496619.6 filed on May 7, 2021, contents of both of which are incorporated herein by reference in their entireties.

TECHNICAL FIELD

The present disclosure relates to the technical field of image processing, for example, an image splicing method, apparatus and device, and a medium.

BACKGROUND

With the rapid development of computer technologies and mobile communication technologies, more and more applications have come into people's lives, greatly enriching people's daily life. These applications provide multiple interactive functions and have acquired more and more favor.

However, a user also expects these applications to provide more interactive functions that satisfy the user's personalized requirements.

SUMMARY

The present disclosure provides an image splicing method, apparatus and device, and a medium.

In a first aspect, the present disclosure provides an image splicing method. The method includes the steps below. A to-be-spliced image and a plurality of template images are acquired, where the to-be-spliced image and each template image of the plurality of template images each include a target object.

A matching degree between the target object in the to-be-spliced image and the target object in the each template image is calculated.

A template image of the plurality of template images whose matching degree satisfies a preset matching condition is determined as a target template image.

A target image portion in the to-be-spliced image is spliced to a target image region in the target template image to obtain a target spliced image, where the target image portion and the target image region correspond to a same portion of the target object.

In a second aspect, the present disclosure provides an image splicing apparatus. The apparatus includes a first acquisition unit, a first processing unit, a second processing unit and an image splicing unit.

The first acquisition unit is configured to acquire a to-be-spliced image and a plurality of template images, where the to-be-spliced image and each template image of the plurality of template images each include a target object.

The first processing unit is configured to calculate a matching degree between the target object in the to-be-spliced image and the target object in the each template image.

The second processing unit is configured to determine a template image of the plurality of template images whose matching degree satisfies a preset matching condition as a target template image.

The image splicing unit is configured to splice a target image portion in the to-be-spliced image to a target image region in the target template image to obtain a target spliced image, where the target image portion and the target image region correspond to a same portion of the target object.

In a third aspect, the present disclosure provides an image splicing device. The device includes a processor and a memory configured to store executable instructions. The processor is configured to read the executable instructions from the memory and execute the executable instructions to perform the image splicing method described in the first aspect.

In a fourth aspect, the present disclosure provides a computer-readable storage medium storing a computer instruction which, when executed by a processor, causes the processor to perform the image splicing method described in the first aspect.

BRIEF DESCRIPTION OF DRAWINGS

The same or similar reference numerals in the drawings denote the same or similar elements. It is to be understood that the drawings are schematic and that originals and elements are not necessarily drawn to scale.

DETAILED DESCRIPTION

Embodiments of the present disclosure are described in more detail hereinafter with reference to the drawings. The drawings illustrate some embodiments of the present disclosure, but it is to be understood that the present disclosure may be implemented in various manners and should not be construed as being limited to the embodiments set forth herein. On the contrary, these embodiments are provided to facilitate more thorough and complete understanding of the present disclosure. It is to be understood that the drawings and embodiments of the present disclosure are merely illustrative and are not intended to limit the scope of the present disclosure.

It is to be understood that steps described in method embodiments of the present disclosure may be performed in a different order and/or in parallel. Additionally, the method embodiments may include additional steps and/or omit some of the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment": the term "another embodiment" means "at least one another embodiment"; and the term "some embodiments" means "at least some embodiments". Definitions of other terms are given in the description hereinafter.

It is to be noted that references to "first", "second" and the like in the present disclosure are merely intended to distinguish one from another apparatus, module or unit and are not intended to limit the order or interrelationship of the functions performed by the apparatus, module, or unit.

It is to be noted that references to modifications of "one" or "a plurality" mentioned in the present disclosure are intended to be illustrative and not limiting, and that those skilled in the art should understand that "one" or "a plurality" should be understood as "one or more" unless clearly expressed in the context.

The names of messages or information exchanged between apparatuses in the embodiments of the present disclosure are only used for illustrative purposes and are not intended to limit the scope of the messages or information.

Embodiments of the present disclosure provide an image splicing method, apparatus and device, and a medium that can satisfy the user's personalized requirements for image splicing.

An image splicing method according to an embodiment of the present disclosure is first illustrated below in conjunction with FIGS. 1 to 6. In this embodiment of the present disclosure, the image splicing method may be executed by an image splicing device.

Figure 1:
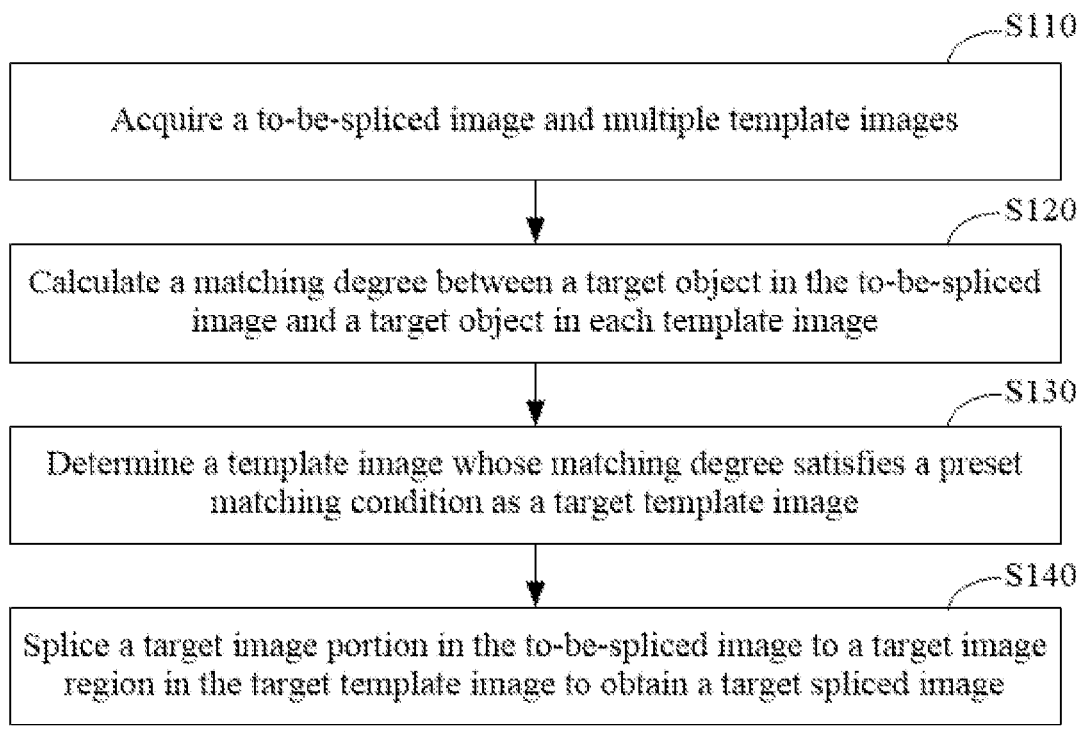
FIG. 1 is a flowchart of an image splicing method according to an embodiment of the present disclosure.

FIG. 1 is a flowchart of an image splicing method according to an embodiment of the present disclosure.

As shown in FIG. 1, the image splicing method includes the steps below.

In S110, a to-be-spliced image and multiple template images are acquired.

In this embodiment of the present disclosure, the image splicing device may first acquire the to-be-spliced image requiring image splicing and after acquiring the to-be-spliced image, then acquire the multiple template images that may be used as an image splicing template of the to-be-spliced image.

In this embodiment of the present disclosure, the to-be-spliced image may include a target object.

For example, the target object may include a whole object such as a person, an animal, or a cartoon image and may also include a partial object in the whole object such as a face, a head, a shoulder, or an upper body. This is not limited herein.

In some embodiments, the image splicing device may shoot an image in real time and use the image as the to-be-spliced image.

In some other embodiments, the image splicing device may also acquire an image locally selected by the user and use the image as the to-be-spliced image.

In some other embodiments, the image splicing device may receive an image sent by another device and use the image as the to-be-spliced image.

In this embodiment of the present disclosure, the template image may also include a target object.

For example, the target object may include a whole object such as a person, an animal, or a cartoon image and may also include a partial object in the whole object such as a face, a head, a shoulder, or an upper body. This is not limited herein.

For example, the template image may be an image in a template image library that may include multiple types of images authorized.

For example, the each template image may include, but is not limited to, an image of a famous picture type, an image of an emoticon package type, an image of a hand-drawn type, an image of a comic type, or an image of a photo type. This is not limited in the present disclosure.

In some embodiments, the image splicing device may acquire all the template images in the template image library after acquiring the to-be-spliced image.

In some other embodiments, after acquiring the to-be-spliced image, the image splicing device may detect an object type to which the target object in the to-be-spliced image belongs and thereby acquire a template image of the target object corresponding to the object type in the template image library.

For example, in the case where the object type to which the target object in the to-be-spliced image belongs is a person type, the image splicing device may acquire a template image corresponding to the person type in the template image library. For another example, in the case where the object type to which the target object in the to-be-spliced image belongs is a face type, the image splicing device may acquire a template image corresponding to the face type in the template image library. For another example, in the case where the object type to which the target object in the to-be-spliced image belongs is a human face type, the image splicing device may acquire a template image corresponding to the human face type in the template image library.

Additionally, in some other embodiments, the image splicing device may also first acquire the multiple template images, then acquire the to-be-spliced image requiring image splicing and thereby perform an image splicing operation based on the acquired multiple template images and the to-be-spliced image.

In S120, a matching degree between a target object in the to-be-spliced image and a target object in each template image is calculated.

In this embodiment of the present disclosure, the image splicing device may perform a matching calculation between the target object in the to-be-spliced image and the target object in the each template image to obtain the matching degree between the target object in the to-be-spliced image and the target object in the each template image.

For example, the matching degree of target objects may be used for representing a similarity degree between the target object in the to-be-spliced image and the target object in the each template image.

In some embodiments, the image splicing device may calculate the matching degree between the target object in the to-be-spliced image and the target object in the each template image using object feature points of the target objects.

In these embodiments, S120 may include steps below.

A to-be-spliced object feature point of the target object in the to-be-spliced image is determined: for the each template image, a template object feature point of the target object in the each template image is mapped to the to-be-spliced image to obtain a mapped object feature point of the target object corresponding to the each template image; and the matching degree between the target object in the to-be-spliced image and the target object in the each template image is calculated according to the to-be-spliced object feature point and each mapped object feature point.

For example, after acquiring the to-be-spliced image and the multiple template images, the image splicing device first determines the to-be-spliced object feature point of the target object in the to-be-spliced image, and maps the template object feature point of the target object in the each template image to the to-be-spliced image according to a mapping relationship between the template object feature point of the target object in the each template object and the to-be-spliced object feature point of the target object in the to-be-spliced image. That is, the template object feature point of the target object in the each template image is normalized in size to the to-be-spliced object feature point of the target object in the to-be-spliced image so that the template object feature point of the target object in the each template image can be aligned with the to-be-spliced object feature point of the target object in the to-be-spliced image to obtain a mapped object feature point of the target object located in the to-be-spliced image and corresponding to the template object feature point of the target object in the each template image, that is, the mapped object feature point of the target object corresponding to the each template image, and thereby the matching calculation can be performed between the to-be-spliced object feature point of the target object in the to-be-spliced image and the mapped object feature point of the target object corresponding to the each template image to obtain the matching degree between the target object in the to-be-spliced image and the target object in the each template image.

For example, the image splicing device may perform an object feature point detection on the to-be-spliced image using an object feature point detection model obtained by pretraining to obtain the to-be-spliced object feature point of the target object in the to-be-spliced image.

For example, the image splicing device may also acquire the template object feature point of the target object in the prestored each template image. The template object feature point of the target object in the each template image may be obtained by detection performed by the object feature point detection model obtained by pre-training.

In these embodiments, the matching degree may include an average pixel difference between a pixel to which the mapped object feature point belongs and a pixel to which the to-be-spliced object feature point belongs. That is, the average pixel difference may be an average value of a pixel value difference between the pixel value of a pixel to which each feature point in mapped object feature points belongs in the to-be-spliced image and the pixel value of a pixel to which a corresponding feature point in to-be-spliced object feature points belongs in the to-be-spliced image.

For example, for the to-be-spliced image and a template image, the image splicing device may extract the pixel value of a pixel to which each feature point in mapped object feature points of a target object corresponding to the template image belongs in the to-be-spliced image and the pixel value of a pixel to which each feature point in the to-be-spliced object feature points of the target object in the to-be-spliced image belongs in the to-be-spliced image, then calculate the pixel value difference between the pixel value corresponding to the each feature point and the pixel value corresponding to the each feature point and finally calculate the average value of all the pixel value differences to obtain the average pixel difference.

In these embodiments, the matching degree may also include an average distance between a pixel to which the mapped object feature point belongs and a pixel to which the to-be-spliced object feature point belongs. That is, the average distance may be an average value of a pixel distance between the pixel position of a pixel to which the each feature point in the mapped object feature points belongs in the to-be-spliced image and the pixel position of a pixel to which the corresponding feature point in the to-be-spliced object feature points belongs in the to-be-spliced image.

For example, for the to-be-spliced image and the template image, the image splicing device may determine the pixel position of the pixel to which the each feature point in the mapped object feature points of the target object corresponding to the template image belongs in the to-be-spliced image and the pixel position of the pixel to which the each feature point in the to-be-spliced object feature points of the target object in the to-be-spliced image belongs in the to-be-spliced image, then calculate the pixel distance between the pixel position corresponding to the each feature point and the pixel position corresponding to the each feature point and finally calculate the average value of all the pixel distances to obtain the average distance.

Therefore, in this embodiment of the present disclosure, the matching degree between the target object in the to-be-spliced image and the target object in the each template image may be calculated more accurately through object feature points.

In some other embodiments, the image splicing device may calculate the matching degree between the target object in the to-be-spliced image and the target object in the each template image using object images corresponding to the target objects.

In these embodiments, S120 may include step below:

An object image of the target object in the each template image is mapped to the to-be-spliced image to obtain a mapped image of the each template image for the target object; and an image similarity degree between an object image of the target object in the to-be-spliced image and the mapped image of the each template image for the target object is used as the matching degree between the target object in the to-be-spliced image and the target object in the each template image.

For example, after acquiring the to-be-spliced image and the multiple template images, the image splicing device may map the object image of the target object in the each template image to the to-be-spliced image according to the mapping relationship between the object image of the target object in the each template image and the object image of the target object in the to-be-spliced image. That is, the object image of the target object in the each template image is normalized in size to the to-be-spliced image so that the object image of the target object in the each template image can be aligned with the object image of the target object in the to-be-spliced image to obtain a mapped image located in the to-be-spliced image and corresponding to the object image of each target object in the each template image, that is, the mapped image of the each template image for the target object, and thereby an image similarity calculation can be performed between the object image of the target object in the to-be-spliced image and the mapped image of the each template image for the target image to obtain the matching degree between the target object in the to-be-spliced image and the target object in the each template image.

For example, the image splicing device may perform an object detection on the to-be-spliced image using an object detection model obtained by pre-training to obtain the object image of the target object in the to-be-spliced image.

For example, the image splicing device may also acquire the object image of the pre-stored target object in the each template image. The object image of the target object in the each template image may be obtained by object detection performed by the object detection model obtained by pre-training.

In S130, a template image whose matching degree satisfies a preset matching condition is determined as a target template image.

In this embodiment of the present disclosure, after acquiring the matching degree between the target object in the to-be-spliced image and the target object in the each template image, the image splicing device may screen the multiple template images according to the matching degree and screen, from the multiple template images, the template image whose matching degree satisfies the preset matching condition to use the screened template image as the target template image, that is, a source image for performing image splicing on the to-be-spliced image.

In some embodiments, in the case where the matching degree includes the average pixel difference between the pixel to which the mapped object feature point belongs and the pixel to which the to-be-spliced object feature point belongs, the preset matching condition may include any one of that: the average pixel difference is the smallest among the multiple template images, or that the average pixel difference is less than or equal to a preset pixel difference threshold.

In one example, the preset matching condition may include that the average pixel difference is the smallest among the multiple template images, that is, the target template image may be a template image corresponding to the smallest average pixel difference among multiple average pixel differences.

For example, after calculating the average pixel difference between the pixel to which the mapped object feature point corresponding to the each template image belongs and the pixel to which the to-be-spliced object feature point belongs, the image splicing device may sort the multiple average pixel differences in an ascending order, use the first sorted average pixel difference as the smallest average pixel difference and use the template image corresponding to the smallest average pixel difference as the target template image.

In another example, the preset matching condition may include that the average pixel difference is less than or equal to the preset pixel difference threshold, that is, the target template image may be a template image corresponding to at least one average pixel difference less than or equal to the preset pixel difference threshold among the multiple average pixel differences.

For example, after calculating the average pixel difference between the pixel to which the mapped object feature point corresponding to the each template image belongs and the pixel to which the to-be-spliced object feature point belongs, the image splicing device may compare the multiple average pixel differences with the preset pixel difference threshold to find the at least one average pixel difference less than or equal to the preset pixel difference threshold and thereby use the template image corresponding to the at least one found average pixel difference as the target template image.

The preset pixel difference threshold may be any value preset as required. This is not limited herein. In some other embodiments, in the case where the matching degree includes the average distance between the pixel to which the mapped object feature point belongs and the pixel to which the to-be-spliced object feature point belongs, the preset matching condition may include any one of that: the average distance is the smallest among the multiple template images, or that the average distance is less than or equal to a preset distance threshold.

In one example, the preset matching condition may include that the average distance is the smallest among the multiple template images, that is, the target template image may be a template image corresponding to the smallest average distance among multiple average distances.

For example, after calculating the average distance between the pixel to which the mapped object feature point corresponding to the each template image belongs and the pixel to which the to-be-spliced object feature point belongs, the image splicing device may sort the multiple average distances in an ascending order, use the first sorted average distance as the smallest average distance and use the template image corresponding to the smallest average distance as the target template image.

In another example, the preset matching condition may include that the average distance is less than or equal to the preset distance threshold, that is, the target template image may be a template image corresponding to at least one average distance less than or equal to the preset distance threshold among the multiple average distances.

For example, after calculating the average distance between the pixel to which the mapped object feature point corresponding to the each template image belongs and the pixel to which the to-be-spliced object feature point belongs, the image splicing device may compare the multiple average distances with the preset distance threshold to find the at least one average distance less than or equal to the preset distance threshold and thereby use the template image corresponding to the at least one found average distance as the target template image.

The preset distance threshold may be any value preset as required. This is not limited herein.

In some other embodiments, in the case where the matching degree includes the image similarity degree between the object image of the target object in the to-be-spliced image and the mapped image of the each template image for the target object, the preset matching condition may include any one of that: the image similarity degree is the smallest among the multiple template images, or that the image similarity degree is less than or equal to a preset similarity degree threshold.

In one example, the preset matching condition may include that the image similarity degree is the smallest among the multiple template images, that is, the target template image may be a template image corresponding to the smallest image similarity degree among multiple image similarity degrees.

For example, after calculating the image similarity degree between the object image of the target object in the to-be-spliced image and the mapped image of the each template image for the target object, the image splicing device may sort the multiple image similarity degrees in an ascending order, use the first sorted image similarity degree as the smallest image similarity degree and use the template image corresponding to the smallest image similarity degree as the target template image.

In another example, the preset matching condition may include that the image similarity degree is less than or equal to the preset similarity degree threshold, that is, the target template image may be a template image corresponding to at least one image similarity degree less than or equal to the preset similarity degree threshold among the multiple image similarity degrees.

For example, after calculating the image similarity degree between the object image of the target object in the to-be-spliced image and the mapped image of the each template image for the target object, the image splicing device may compare the multiple image similarity degrees with the preset similarity degree threshold to find the at least one image similarity degree less than or equal to the preset similarity degree threshold and thereby use the template image corresponding to the at least one found image similarity degree as the target template image.

The preset similarity degree threshold may be any value preset as required. This is not limited herein.

In S140, a target image portion in the to-be-spliced image is spliced to a target image region in the target template image to obtain a target spliced image.

In this embodiment of the present disclosure, after determining the target template image, the image splicing device may splice the target image portion in the to-be-spliced image to the target image region in the target template image to use the target image portion in the to-be-spliced image to replace the original image content in the target image region in the target template image so as to obtain the target spliced image so that the target spliced image can simultaneously have at least some features of the target object in the to-be-spliced image.

The target image portion may include at least a portion of image content of the object image of the target object in the to-be-spliced image, that is, the target image portion may include image content corresponding to at least a portion of the target object in the to-be-spliced image.

For example, the target image portion and the target image region correspond to the same portion of the target object. For example, if the target image portion is image content corresponding to a certain portion of the target object in the to-be-spliced image, the target image region is an image region corresponding to the same portion of the target object in the target template image.

In this embodiment of the present disclosure, the target template image whose matching degree between the target object in the to-be-spliced image and the target object in the target template image satisfies the preset matching condition can be selected for the to-be-spliced image from the multiple template images to perform an automatic matching of the source image for image splicing based on the matching degree between the target object in the each template image and the target object in the to-be-spliced image, and thereby the target image portion corresponding to the at least a portion of the target object in the to-be-spliced image is spliced to the target image region corresponding to the same portion of the target object in the target template image to obtain the target spliced image so that the target spliced image can satisfy the user's personalized requirements for image splicing and improve the user experience.

In another embodiment of the present disclosure, to satisfy the user's personalized requirements, the target object may include a face.

The face may be any object's face. The object may include, but is not limited to, a person, an animal, or a cartoon image.

For example, the matching degree between the target object in the to-be-spliced image and the target object in the each template image is the matching degree between a face in the to-be-spliced image and a face in the each template image.

In some embodiments, the image splicing device may calculate the matching degree between the target object in the to-be-spliced image and the target object in the each template image using face feature points of the faces. The calculation of the matching degree is as described in the preceding, and details are not repeated herein.

In some other embodiments, the image splicing device may calculate the matching degree between the face in the to-be-spliced image and the face in the each template image using face images corresponding to the faces. The calculation of the matching degree is as described in the preceding, and details are not repeated herein.

For example, the image splicing device may splice a target image portion in a face image in the to-be-spliced image to a target image region in an image region to which a face image in the target template image belongs to obtain the target spliced image.

In these embodiments, the portion of the target object corresponding to the target image portion and the target image region may be a target face portion in the face. The target face portion may include at least one of: eyebrows, eyes, ears, a nose, or a mouth.

In some embodiments, in the case where the target face portion includes the eyebrows, the eyes, the ears, the nose, or the mouth, the target image portion may include one image portion including the whole target face portion and having the specified size and shape corresponding to the target template image in the to-be-spliced image.

At this point, the target image region may be one whole image region having the same specified size and shape in the target template image.

The preceding specified size and shape may be preset as required. This is not limited herein. The specified shape may include at least one of: a rectangle, a trapezoid, or an oval.

Using the target face portion including the eyes as an example, the target image portion in the to-be-spliced image may be one image portion including two eyes and having the specified size and shape, and the target image region may be one whole image region including two eyes and having the specified size and shape in the target template image. An illustration is made below using FIGS. 2 and 3 as an example.

Figure 2:
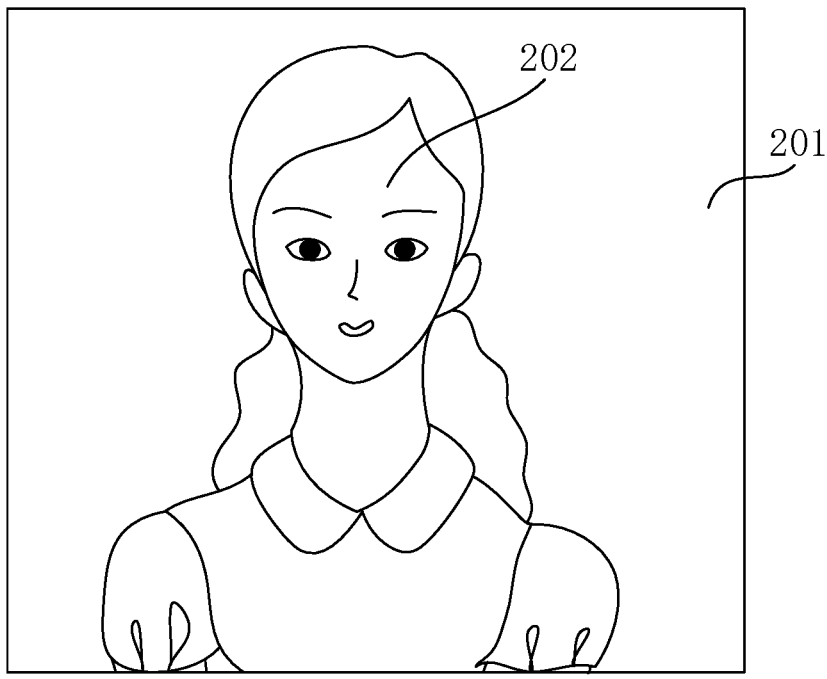
FIG. 2 is a diagram illustrating a template image according to an embodiment of the present disclosure.
Figure 3:
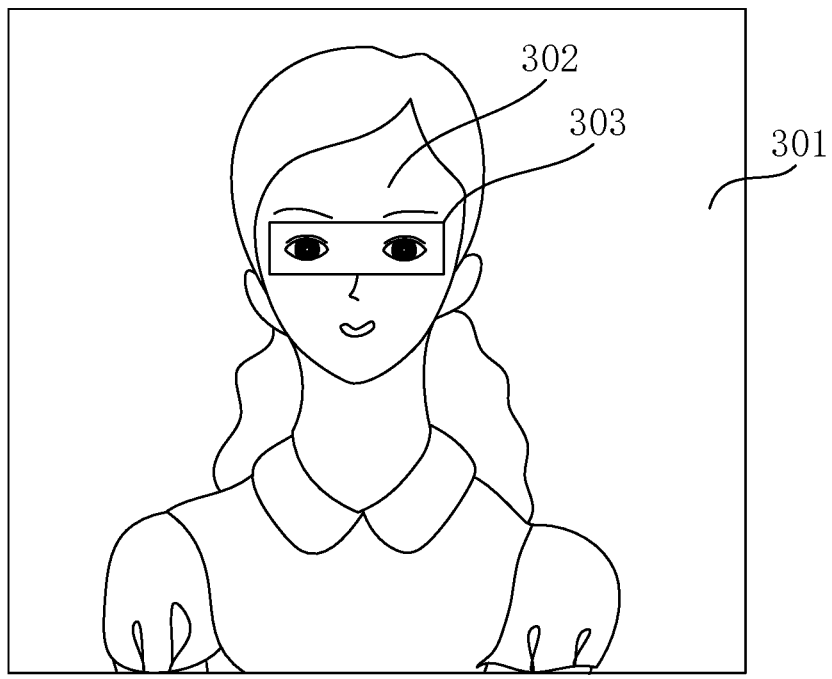
FIG. 3 is a diagram illustrating a target spliced image according to an embodiment of the present disclosure.

FIG. 2 is a diagram illustrating a template image according to an embodiment of the present disclosure. FIG. 3 is a diagram illustrating a target spliced image according to an embodiment of the present disclosure.

As shown in FIG. 2, the person in the template image 201 has a template face 202. As shown in FIG. 3, the person in the target spliced image 301 has a spliced face 302. The spliced face 302 has a spliced rectangle whole eye image 303. The whole eye image 303 wholly covers the two eyes, the image content between the two eyes and the image content surrounding the two eyes in the template face 202 shown in FIG. 2, and thereby the target spliced image 301 is generated.

In some other embodiments, in the case where target face portions include the eyebrows, the eyes and the ears, target image portions may also be two image portions each including a split target face portion and each having the specified size and shape corresponding to the target template image. At this point, target image regions may be two split image regions having the same specified size and shape.

The preceding specified size and shape may be preset as required. This is not limited herein. The specified shape may include at least one of: a rectangle, a trapezoid, or an oval.

Continuing to use the target face portion including the eyes as an example, the target image portions in the to-be-spliced image may also be two image portions each including an eye and each having the specified size and shape, and the target image regions may be two split image regions each including an eye and each having the specified size and shape. An illustration is made below using FIGS. 2 and 4 as an example.

Figure 4:
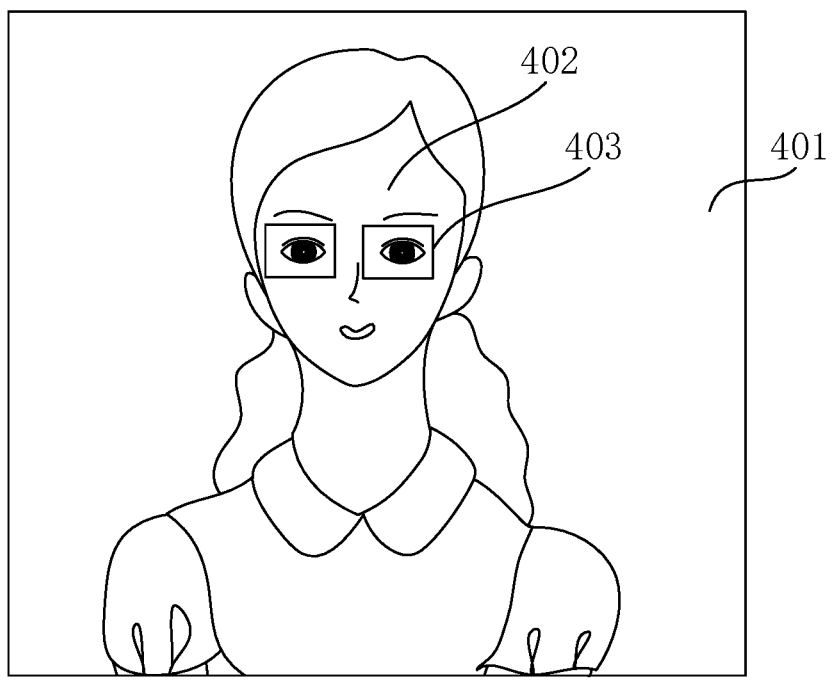
FIG. 4 is a diagram illustrating another target spliced image according to an embodiment of the present disclosure.

FIG. 4 is a diagram illustrating another target spliced image according to an embodiment of the present disclosure.

As shown in FIG. 4, the person in the target spliced image 401 has a spliced face 402. The spliced face 402 has two spliced rectangle split eye images 403. Each split eye image 403 covers an eye and the image content surrounding the eye in the template face 202 shown in FIG. 2, and thereby the target spliced image 401 is generated.

For example, the target image portions may also include at least two image portions each including one whole face portion and each having the specified size and shape corresponding to the target template image. At this point, the target region regions may include at least two whole portion regions each having the same specified size and shape as each image portion.

The preceding specified size and shape may be preset as required. This is not limited herein. The specified shape may include at least one of: a rectangle, a trapezoid, or an oval.

Using the target face portions including the eyes and the mouth as an example, the target image portions in the to-be-spliced image may include one image portion including two eyes and having the specified size and shape and one portion image including a mouth and having the specified size and shape, and the target image regions may include one whole portion region including two eyes and having the same specified size and shape as the image portion to which the two eyes belong and one whole portion region including a mouth and having the same specified size and shape as the image portion to which the mouth belongs. An illustration is made below using FIGS. 2 and 5 as an example.

Figure 5:
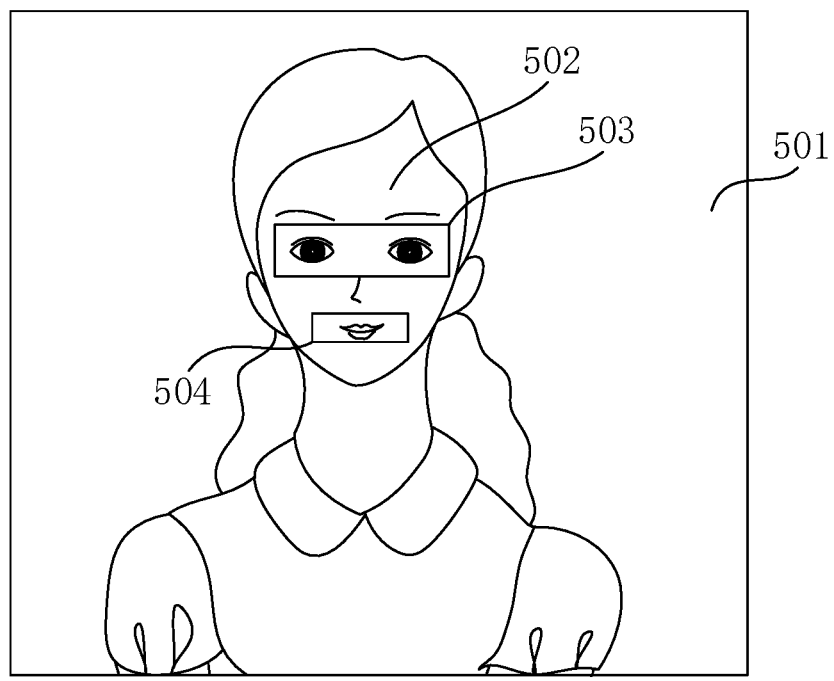
FIG. 5 is a diagram illustrating another target spliced image according to an embodiment of the present disclosure.

FIG. 5 is a diagram illustrating another target spliced image according to an embodiment of the present disclosure.

As shown in FIG. 5, the person in the target spliced image 501 has a spliced face 502. The spliced face 502 has a spliced rectangle whole eye image 503 and a spliced rectangle whole mouth image 504. The whole eye image 503 wholly covers the two eyes, the image content between the two eyes and the image content surrounding the two eyes in the template face 202 shown in FIG. 2, and the whole mouth image 504 wholly covers the mouth and the image content surrounding the mouth in the template face 202 shown in FIG. 2, and thereby the target spliced image 501 is generated.

Therefore, in this embodiment of the present disclosure, the target template image whose matching degree between the face in the to-be-spliced image and the face in the target template image satisfies the preset matching condition can be selected for the to-be-spliced image from the multiple template images to perform an automatic matching of the source image based on the matching degree between the face in the each template image and the face in the to-be-spliced image, and thereby the target image portion corresponding to the target face portion in the to-be-spliced image is spliced to the target image region to which the target face portion in the selected target template image belongs to obtain the target spliced image so that the target spliced image can satisfy the user's personalized requirements and improve the user experience. In another embodiment of the present disclosure, the mapping relationship between the template object feature point of the target object in the each template image and the to-be-spliced object feature point of the target object in the to-be-spliced image may include an optimal affine transformation matrix from the template object feature point to the to-be-spliced object feature point.

In these embodiments, that the template object feature point of the target object in the each template image is mapped to the to-be-spliced image to obtain the mapped object feature point of the target object corresponding to the each template image may include steps below.

The optimal affine transformation matrix from the template object feature point to the to-be-spliced object feature point is calculated; and that the template object feature point is mapped to the to-be-spliced image according to the optimal affine transformation matrix to obtain the mapped object feature point.

For example, the image splicing device may perform affine transformation processing from each template object feature point to the to-be-spliced object feature point to calculate an optimal affine transformation matrix from the each template object feature point to the to-be-spliced object feature point and multiply the each template object feature point by a corresponding optimal affine transformation matrix to obtain the mapped object feature point corresponding to the each template object feature point.

For example, the image splicing device may traverse the multiple template images, for the each template image, perform affine transformation processing from the template object feature point of the target object in the each template image to the to-be-spliced object feature point of the target object in the to-be-spliced image to calculate the optimal affine transformation matrix from the template object feature point of the target object in the each template image to the to-be-spliced object feature point of the target object in the to-be-spliced image, multiply the each feature point in template object feature points of the target object in the each template image by the corresponding optimal affine transformation matrix to map the each feature point in the template object feature points of the target object in the each template image to the to-be-spliced image and thereby obtain a mapped face feature point corresponding to the template object feature point of the target object in the template image.

In these embodiments, the image splicing device may use the mapping relationship between the template object feature point of the target object in the each template image and the to-be-spliced object feature point of the target object in the to-be-spliced image as the mapping relationship between the object image of the target object in the each template image and the object image of the target object in the to-be-spliced image, that is, to use the optimal affine transformation matrix from the template object feature point to the to-be-spliced object feature point as the mapping relationship between the object image of the target object in the each template image and the object image of the target object in the to-be-spliced image.

For example, during the process of traversing the multiple template images, for the each template image, after calculating the optimal affine transformation matrix from the template object feature point of the target object in the each template image to the to-be-spliced object feature point of the target object in the to-be-spliced image, the image splicing device may multiply each pixel of the object image of the target object in the each template image by a corresponding optimal affine transformation matrix to map the each pixel of the object image of the target object in the each template image to the to-be-spliced image and thereby obtain the mapped image of the each template image for the target object.

Therefore, in this embodiment of the present disclosure, the optimal affine transformation matrix from the template object feature point to the to-be-spliced object feature point may be used for mapping the template object feature point of the target object in the each template image and the object image of the target object in the each template image to the to-be-spliced image so that the accuracy of a mapped result can be improved, and thereby the accuracy of the acquired target template image can be improved.

In another embodiment of the present disclosure, the image splicing device may use a splicing mask image corresponding to the target template image to implement the image splicing between the to-be-spliced image and the target template image.

In these embodiments, S140 shown in FIG. 1 may include steps below.

The to-be-spliced image is mapped to the target template image to obtain a mapped target template image; and that a target image portion in the mapped target template image is spliced to the target image region in the target template image to obtain the target spliced image based on a splicing mask image corresponding to the target template image.

For example, the image splicing device may map the to-be-spliced image to the target template image according to the mapping relationship between the target object in the to-be-spliced image and the target object in the each template image, that is, the to-be-spliced image is normalized in size to the target template image, so that the to-be-spliced image can be aligned with the target template image to obtain the mapped target template image, and thereby the mapped target template image can be fused with the target template image using the splicing mask image corresponding to the target template image to splice the target image portion in the mapped target template image to the target image region in the target template image by the splicing mask image so as to obtain the target spliced image.

For example, the mapping relationship between the target object in the to-be-spliced image and the target object in the each template image may include an optimal affine transformation invertible matrix from a target template object feature point of the target object in the target template image to the to-be-spliced object feature point in the to-be-spliced image.

That the to-be-spliced image is mapped to the target template image to obtain the mapped target template image may include steps below.

The optimal affine transformation invertible matrix from a target template object feature point of the target object in the target template image to the to-be-spliced object feature point of the target object in the to-be-spliced image is calculated; and that the to-be-spliced image is mapped to the target template image according to the optimal affine transformation invertible matrix to obtain the mapped target template image.

For example, the image splicing device may acquire the optimal affine transformation matrix from the template object feature point of the target object in the target template image to the to-be-spliced object feature point of the target object in the to-be-spliced image, calculate the invertible matrix of the optimal affine transformation matrix to obtain the optimal affine transformation invertible matrix from the target template object feature point of the target object in the target template image to the to-be-spliced object feature point in the to-be-spliced image and then multiple each pixel in the to-be-spliced image by the optimal affine transformation invertible matrix to map the each pixel in the to-be-spliced image to the target template image so as to obtain the mapped target template image corresponding to the to-be-spliced image so that the size and position of the target object in the mapped target template image can be the same as the size and position of the target object in the target template image.

For example, the device splicing device may acquire the splicing mask image corresponding to the target template image from multiple pre-stored splicing mask images.

The splicing mask image corresponding to the target template image may be used for extracting the target image portion located in the target image region in the target template image in the mapped target template image and the original image portion outside the target image region in the target template image in the mapped target template image and splicing the extracted target image portion and the original image portion to obtain the target spliced image.

In these embodiments, before S140 shown in FIG. 1, the image splicing method may further include steps below.

The target image region is determined according to the target template object feature point; and the splicing mask image is generated according to the target image region.

For example, the image splicing device may first perform an object feature point detection on the each template image using an object feature point detection model obtained by pre-training to obtain the template object feature point of the target object in the each template image, then determine the target image region to which a target portion of the target object in the each template image belongs based on the template object feature point according to a preset region determination mode and thereby generate the splicing mask image corresponding to the each template image according to the target image region so that the splicing mask image can be used for extracting the target image portion to which the target portion of the target object in the mapped target template image belongs and the original image portion outside the target image region to which the target portion of the target object in the target template image in the mapped target template image belongs and splicing the extracted target image portion and the original image portion to obtain the target spliced image.

For example, that the image splicing device determines the target image region according to the target template object feature point may include that among template object feature points of the target object in the each template image, a feature point corresponding to the target portion of the target object is determined, the smallest image region having the specified shape and surrounding the determined feature point is calculated, and the smallest image region is finally enlarged by a predetermined ratio to obtain the target image region.

Using the target object being the face, and the target portion of the target object being the target face portion in the face as an example, the image splicing device may determine a feature point corresponding to the target face portion among face feature points in the each template image, calculate the smallest image region having the specified shape and surrounding the determined feature point and finally enlarge the smallest image region by the predetermined ratio to obtain the target image region.

In another embodiment of the present disclosure, to improve the image splicing quality, before S110 shown in FIG. 1, the image splicing method may further include steps below.

Multiple preset images are acquired; and the multiple template images that satisfy a preset template condition are screened from the multiple preset images.

In this embodiment of the present disclosure, the image splicing device may first acquire the multiple preset images, then performs an image detection on each preset image to determine whether the each preset image satisfies the preset template condition, thereby screen out the multiple template images that satisfy the preset template condition and store the screened multiple template images in the template image library.

The preset template condition may include at least one of that: an image proportion of the target object is greater than or equal to a preset ratio threshold, an object angle of the target object is less than or equal to a preset angle threshold, or an object size of the target object is greater than or equal to a preset size threshold.

Object angles may include attitude angles of the target object such as Euler angles. This is not limited herein.

Therefore, in this embodiment of the present disclosure, an image having the target object satisfying the requirement may be used as the each template image, and thereby after the to-be-spliced image and the each template image are spliced, features of the spliced target object may be more noticeable, and the user may see the spliced effect more easily, not only improving the image splicing quality, but also improving the user experience.

Using the target object including the face as an example, the preset template condition may include at least one of that: the image proportion of the face is greater than or equal to the preset ratio threshold, the face angle is less than or equal to the preset angle threshold, or the face size is greater than or equal to the preset size threshold.

In the case where the preset template condition includes that the image proportion of the face is greater than or equal to the preset ratio threshold, the image splicing device may perform a face detection on a preset image using a face detection model obtained by pre-training to obtain the face image in the preset image, calculate a ratio between the face image and the preset image, where the ratio is the image proportion of the face, then screen out the preset image whose image proportion of the face is greater than or equal to the preset ratio threshold and use the screened preset image as the template image.

The preset ratio threshold may be preset as required. This is not limited herein.

In the case where the preset template condition includes that the face angle is less than or equal to the preset angle threshold, the device splicing device may perform a face attitude detection on a preset image using a face attitude detection model obtained by pre-training to obtain the face attitude angle in the preset image, where the face attitude angle is the face angle, then screen out the preset image whose face angle is less than or equal to the preset angle threshold and use the screened preset image as the template image.

The preset angle threshold may be preset as required, and face attitude angles may include face Euler angles. This is not limited herein.

In the case where the preset template condition includes that the face size is greater than or equal to the preset size threshold, the image splicing device may perform a face detection on a preset image using the face detection model obtained by pre-training to obtain the face image in the preset image, calculate the size of the face image, where the size is the face size, then screen out the preset image whose face size is greater than or equal to the preset size threshold and use the screened preset image as the template image.

The preset size threshold may be preset as required. This is not limited herein.

Therefore, in this embodiment of the present disclosure, an image having the face satisfying the requirement may be used as the each template image, and thereby after the to-be-spliced image and the each template image are spliced, features of the spliced face may be more noticeable, and the user may see the spliced effect more easily, not only improving the image splicing quality, but also improving the user experience.

Figure 6:
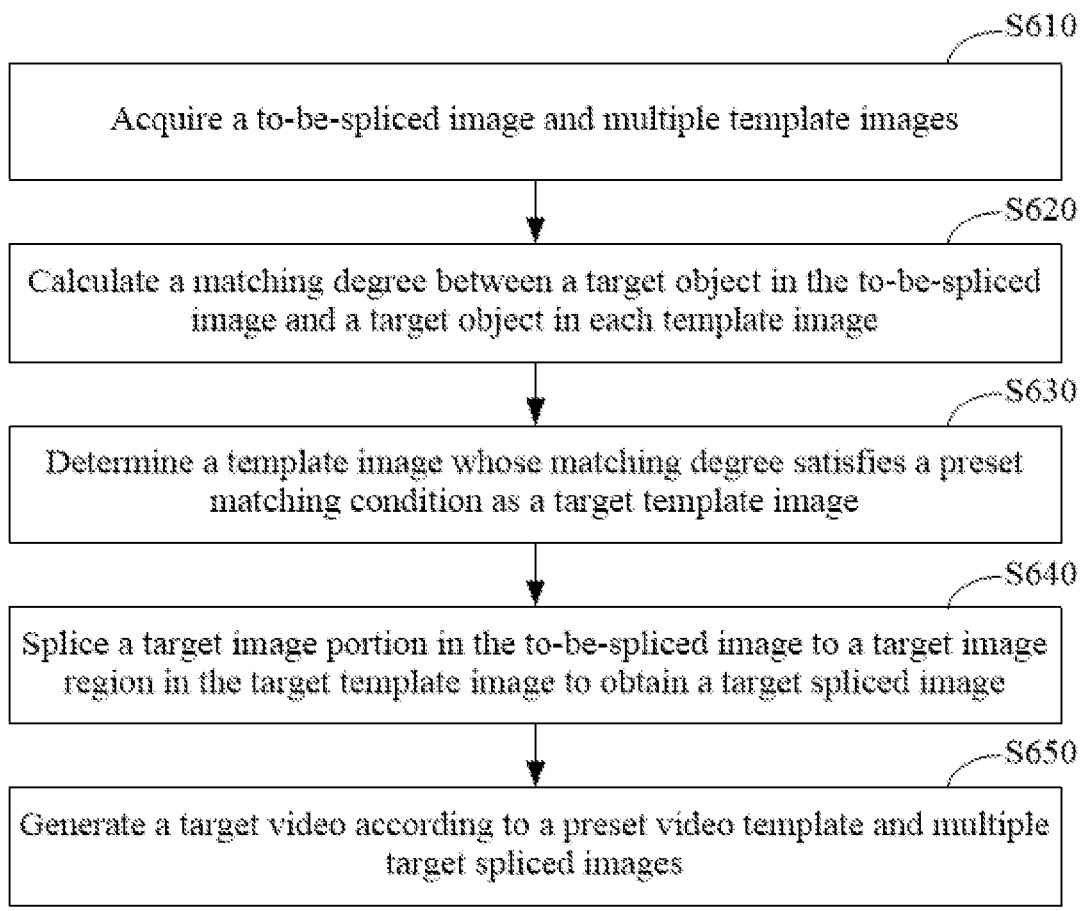
FIG. 6 is a flowchart of another image splicing method according to an embodiment of the present disclosure.

In another embodiment of the present disclosure, to improve the user experience, an image splicing method shown in FIG. 6 is also provided.

FIG. 6 is a flowchart of another image splicing method according to an embodiment of the present disclosure.

As shown in FIG. 6, the image splicing method may include the steps below.

In S610, a to-be-spliced image and multiple template images are acquired.

The to-be-spliced image and each template image each include a target object.

In S620, a matching degree between a target object in the to-be-spliced image and a target object in each template image is calculated.

In S630, a template image whose matching degree satisfies a preset matching condition is determined as a target template image.

In S640, a target image portion in the to-be-spliced image is spliced to a target image region in the target template image to obtain a target spliced image.

The target image portion and the target image region correspond to the same portion of the target object.

It is to be noted that S610 to S640 is similar to S110 to S140 shown in FIG. 1. Details are not repeated herein.

In this embodiment of the present disclosure, multiple target spliced images are provided.

An illustration is made below using an example in which the target object includes the face, and the portion of the target object corresponding to the target image portion and the target image region is the target face portion in the face.

In some embodiments, in the case where target face portions include multiple face portions, the device splicing device may splice a target image portion corresponding to each target face portion in the to-be-spliced image to a target image region to which a corresponding target face portion in the target template image belongs and may splice a combined image of target image portions corresponding to multiple target face portions in the to-be-spliced image to a combined region of target image regions to which corresponding target face portions in the target template image belong to obtain multiple target spliced images.

In some other embodiments, when multiple target template images are provided, the image splicing device may splice the target image portion in the to-be-spliced image to a target image region in each target template image to obtain the multiple target spliced images.

In S650, a target video is generated according to a preset video template and multiple target spliced images.

In this embodiment of the present disclosure, after the image splicing device acquires the multiple target spliced images, the preset video template may be acquired, and the multiple target spliced images are automatically video-edited using the preset video template to obtain the target video.

Therefore, in this embodiment of the present disclosure, a separate to-be-spliced image may be automatically matched to at least one target template image having a similar target object to the separate to-be-spliced image, the separate to-be-spliced image and the at least one target template image are spliced in various forms to obtain the multiple target spliced images, and thereby the target video composed of the multiple target spliced images is generated to facilitate creation of interesting video by the user, improving the user experience.

An embodiment of the present disclosure further provides an image splicing apparatus for performing the preceding image splicing method, which is illustrated below in conjunction with FIG. 7. In this embodiment of the present disclosure, the image splicing apparatus may be executed by an image splicing device.

Figure 7:
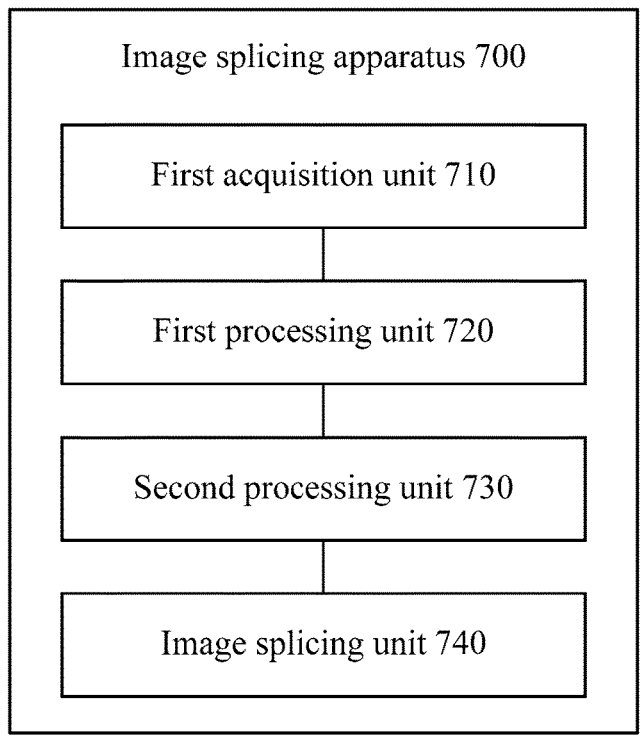
FIG. 7 is a diagram illustrating the structure of an image splicing apparatus according to an embodiment of the present disclosure.

FIG. 7 is a diagram illustrating the structure of an image splicing apparatus according to an embodiment of the present disclosure.

As shown in FIG. 7, the image splicing apparatus 700 may include a first acquisition unit 710, a first processing unit 720, a second processing unit 730 and an image splicing unit 740.

The first acquisition unit 710 may be configured to acquire a to-be-spliced image and multiple template images, where the to-be-spliced image and each template image each include a target object.

The first processing unit 720 may be configured to calculate a matching degree between the target object in the to-be-spliced image and the target object in the each template image.

The second processing unit 730 may be configured to determine a template image whose matching degree satisfies a preset matching condition as a target template image.

The image splicing unit 740 may be configured to splice a target image portion in the to-be-spliced image to a target image region in the target template image to obtain a target spliced image, where the target image portion and the target image region correspond to the same portion of the target object.

In this embodiment of the present disclosure, the target template image whose matching degree between the target object in the to-be-spliced image and the target object in the target template image satisfies the preset matching condition can be selected for the to-be-spliced image from the multiple template images to perform an automatic matching of a source image for image splicing based on the matching degree between the target object in the each template image and the target object in the to-be-spliced image, and thereby the target image portion corresponding to at least a portion of the target object in the to-be-spliced image is spliced to the target image region corresponding to the same portion of the target object in the target template image to obtain the target spliced image so that the target spliced image can satisfy the user's personalized requirements for image splicing and improve the user experience.

In some embodiments of the present disclosure, the first processing unit 720 may include a first processing subunit, a second processing subunit and a third processing subunit.

The first processing subunit may be configured to determine a to-be-spliced object feature point of the target object in the to-be-spliced image.

The second processing subunit may be configured to, for the each template image, map a template object feature point of the target object in the each template image to the to-be-spliced image to obtain a mapped object feature point of the target object corresponding to the each template image.

The third processing subunit may be configured to calculate the matching degree between the target object in the to-be-spliced image and the target object in the each template image according to the to-be-spliced object feature point and each mapped object feature point.

In some embodiments of the present disclosure, the second processing subunit may be configured to calculate an optimal affine transformation matrix from the template object feature point to the to-be-spliced object feature point, and map the template object feature point to the to-be-spliced image according to the optimal affine transformation matrix to obtain the mapped object feature point.

In some embodiments of the present disclosure, the matching degree includes an average pixel difference between a pixel to which the mapped object feature point belongs and a pixel to which the to-be-spliced object feature point belongs.

Accordingly, the matching condition may include any one of that: the average pixel difference is the smallest among the multiple template images, or the average pixel difference is less than or equal to a preset pixel difference threshold.

In some embodiments of the present disclosure, the matching degree includes an average distance between the pixel to which the mapped object feature point belongs and the pixel to which the to-be-spliced object feature point belongs.

Accordingly, the matching condition may include any one of that: the average distance is the smallest among the multiple template images, or the average distance is less than or equal to a preset distance threshold.

In some embodiments of the present disclosure, the image splicing unit 740 may include a fourth processing subunit and a fifth processing subunit.

The fourth processing subunit may be configured to map the to-be-spliced image to the target template image to obtain a mapped target template image.

The fifth processing subunit may be configured to splice a target image portion in the mapped target template image to the target image region in the target template image to obtain the target spliced image based on a splicing mask image corresponding to the target template image.

In some embodiments of the present disclosure, the fourth processing subunit may be configured to calculate an optimal affine transformation invertible matrix from a target template object feature point of the target object in the target template image to the to-be-spliced object feature point of the target object in the to-be-spliced image, and map the to-be-spliced image to the target template image according to the optimal affine transformation invertible matrix to obtain the mapped target template image.

In some embodiments of the present disclosure, the image splicing apparatus 700 may further include a third processing unit and a fourth processing unit.

The third processing unit may be configured to determine the target image region according to the target template object feature point.

The fourth processing unit may be configured to generate the splicing mask image according to the target image region.

In some embodiments of the present disclosure, the image splicing apparatus 700 may further include a second acquisition unit and a fifth processing unit.

The second acquisition unit may be configured to acquire multiple preset images before the to-be-spliced image and the multiple template images are acquired.

The fifth processing unit may be configured to screen, from the multiple preset images, the multiple template images that satisfy a preset template condition.

Accordingly, the preset template condition may include at least one of that: an image proportion of the target object is greater than or equal to a preset ratio threshold, an object angle of the target object is less than or equal to a preset angle threshold, or an object size of the target object is greater than or equal to a preset size threshold.

In some embodiments of the present disclosure, the target object includes a face.

In some embodiments of the present disclosure, multiple target spliced images are provided.

Accordingly, the image splicing apparatus 700 may further include a video generation unit. The video generation unit may be configured to generate a target video according to a preset video template and the multiple target spliced images after the multiple target spliced images are obtained.

It is to be noted that the image splicing apparatus 700 shown in FIG. 7 may execute multiple steps and perform multiple processes and effects in the method embodiments shown in FIGS. 1 to 6.

Details are not repeated herein.

An embodiment of the present disclosure further provides an image splicing device. The image splicing device may include a processor and a memory. The memory may be configured to store executable instructions. The processor may be configured to read the executable instructions from the memory and execute the executable instructions to perform the image splicing method in the preceding embodiments.

Figure 8:
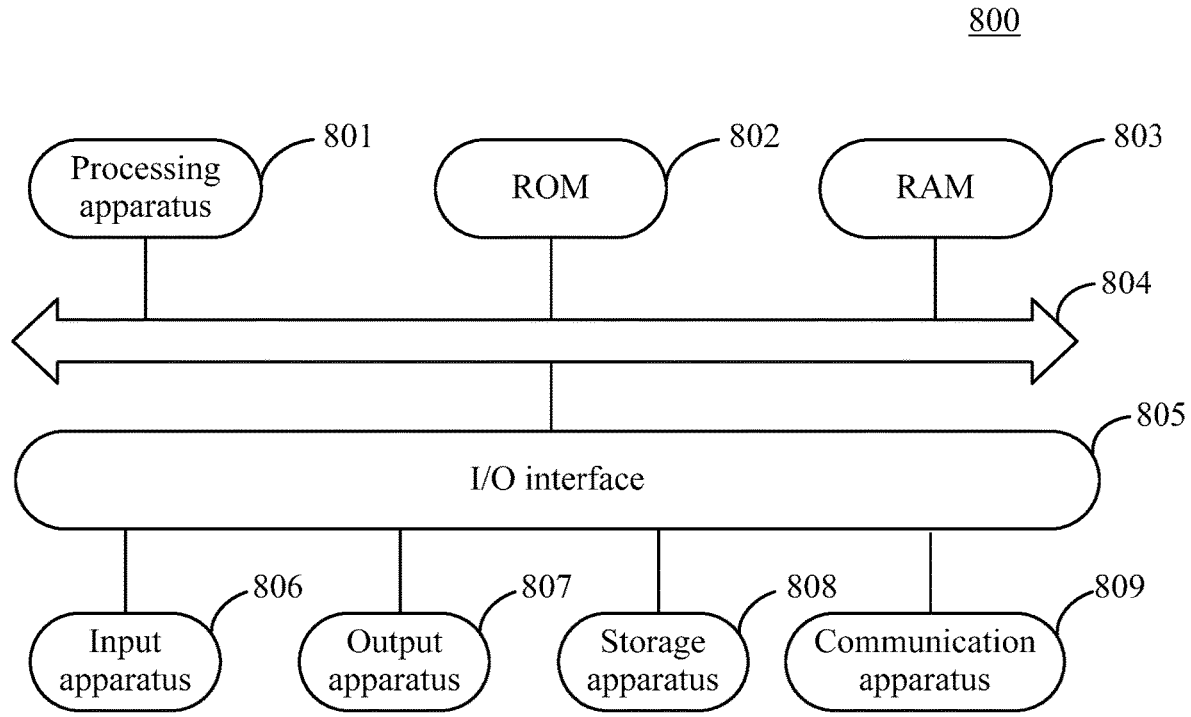
FIG. 8 is a diagram illustrating the structure of an image splicing device according to an embodiment of the present disclosure.

FIG. 8 is a diagram illustrating the structure of an image splicing device according to an embodiment of the present disclosure. FIG. 8 shows a diagram illustrating the structure of an image splicing device 800 applicable to implementing an embodiment of the present disclosure.

It is to be noted that the image splicing device 800 shown in FIG. 8 is merely an example and is not intended to limit the function and use scope of embodiments of the present disclosure.

As shown in FIG. 8, the image splicing device 800 may include a processing apparatus 801 (such as a central processing unit and a graphics processing unit). The processing apparatus 801 may execute various types of appropriate operations and processing based on a program stored in a read-only memory (ROM) 802 or a program loaded from a storage apparatus 808 to a random-access memory (RAM) 803. The RAM 803 also stores various programs and data required for the operation of the image splicing device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 such as a touch screen, a touchpad, a keyboard, a mouse, a camera, a microphone, an accelerometer and a gyroscope: an output apparatus 807 such as a liquid crystal display (LCD), a speaker and a vibrator: the storage apparatus 808 such as a magnetic tape and a hard disk; and a communication apparatus 809. The communication apparatus 809 may allow the image splicing device 800 to perform wireless or wired communication with other devices to exchange data. Although FIG. 8 shows the image splicing device 800 having various apparatuses, it is to be understood that not all the apparatuses shown herein need to be implemented or present. Alternatively, more or fewer apparatuses may be implemented.

An embodiment of the present disclosure further provides a computer-readable storage medium storing a computer program which, when executed by a processor, causes the processor to perform the image splicing method in the preceding embodiments.

According to the embodiments of the present disclosure, the processes described in the preceding with reference to the flowcharts may be implemented as computer software programs. For example, an embodiment of the present disclosure includes a computer program product. The computer program product includes a computer program carried on a non-transitory computer-readable medium. The computer program includes program codes for performing the methods illustrated in the flowcharts. In such an embodiment, the computer program may be downloaded and installed from a network via the communication apparatus 809, or may be installed from the storage apparatus 808, or may be installed from the ROM 802. When the computer program is executed by the processing apparatus 801, the preceding functions defined in the image splicing method according to the embodiments of the present disclosure are performed.

It is to be noted that the preceding computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared or semiconductor system, apparatus or device, or any combination thereof. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof. In the present disclosure, the computer-readable storage medium may be any tangible medium including or storing a program. The program may be used by or in conjunction with an instruction execution system, apparatus, or device. In the present disclosure, the computer-readable signal medium may include a data signal propagated in baseband or as part of a carrier wave, where computer-readable program codes are carried in the data signal. The data signal propagated in this manner may be in various forms, including, but not limited to, an electromagnetic signal, an optical signal, or any appropriate combination thereof. The computer-readable signal medium may also be any computer-readable medium other than the computer-readable storage medium. The computer-readable signal medium may send, propagate or transmit a program used by or in conjunction with an instruction execution system, apparatus, or device. The program codes included on the computer-readable medium may be transmitted via any appropriate medium including, but not limited to, an electrical wire, an optical cable, a radio frequency (RF), or any appropriate combination thereof.

In some embodiments, clients and servers can communicate using any network protocol known or developed in the future, such as an HTTP, and may be interconnected via any form or medium of digital data communication (for example, a communication network). Examples of the communication network include a local area network ("LAN"), a wide area network ("WAN"), an internet (such as the Internet), a peer-to-peer network (such as an ad hoc peer-to-peer network), as well as any currently known or future developed network.

The computer-readable medium may be included in the preceding image splicing device or may exist alone without being assembled into the image splicing device.

The computer-readable medium carries one or more programs which, when executed by the image splicing device, cause the image splicing device to perform the steps below:

A to-be-spliced image and multiple template images are acquired, where the to-be-spliced image and each template image each include a target object. A matching degree between the target object in the to-be-spliced image and the target object in the each template image is calculated. A template image whose matching degree satisfies a preset matching condition is determined as a target template image. A target image portion in the to-be-spliced image is spliced to a target image region in the target template image to obtain a target spliced image, where the target image portion and the target image region correspond to the same portion of the target object.

In this embodiment of the present disclosure, computer program codes for executing operations in the present disclosure may be written in one or more programming languages or a combination thereof. The preceding programming languages include, but are not limited to, an object-oriented programming language such as Java, Smalltalk, or C++ and may also include a conventional procedural programming language such as C or a similar programming language. The program codes may be executed entirely or partially on a user computer, as a separate software package, partially on the user computer and partially on a remote computer. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings illustrate possible architectures, functions and operations of the system, method and computer program product according to the embodiments of the present disclosure. In this regard, each block in the flowcharts or block diagrams may represent a module, a program segment or part of codes. The module, program segment or part of codes contains one or more executable instructions for implementing specified logical functions.

It is also to be noted that in some alternative implementations, the functions marked in the blocks may be implemented in an order different from those marked in the drawings. For example, two successive blocks may, in fact, be performed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The name of a unit is not intended to limit the unit in a certain circumstance.

The functions described herein may be performed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program used by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. More specific examples of the machine-readable storage medium may include an electrical connection with one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof.

The preceding description is merely illustrative of example embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combination of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are illustrated in a particular order, it should not be construed as that the operations are required to be performed in the particular order shown or in a sequential order. In certain circumstances, multitasking and parallel processing may be advantageous. Similarly, although several specific implementation details are included in the preceding discussion, these should not be construed as limitations on the scope of the present disclosure. Certain features described in the context of separate embodiments may also be implemented in combination in a single embodiment. Rather, features described in the context of a single embodiment may also be implemented in multiple embodiments separately or in any appropriate sub-combination.

What is claimed is:

1. An image splicing method, comprising:
   acquiring a to-be-spliced image and a plurality of template images, wherein the to-be-spliced image and each template image of the plurality of template images each comprise a target object;
   based on an object feature point detection model obtained by pre-training, determining a to-be-spliced object feature point of the target object in the to-be-spliced image, and obtaining a template object feature point of the target object in the each template image;
   for the each template image, calculating an optimal affine transformation matrix from the template object feature point to the to-be-spliced object feature point, and mapping the template object feature point to the to-be-spliced image according to the optimal affine transformation matrix to obtain a mapped object feature point;
   based on an average pixel difference or an average distance between a pixel to which the mapped object feature point belongs and a pixel to which the to-be-spliced object feature point belongs, calculating a matching degree between the target object in the to-be-spliced image and the target object in the each template image;
   determining a template image of the plurality of template images whose matching degree satisfies a preset matching condition as a target template image; and
   based on a splicing mask image corresponding to the target template image, splicing a target image portion in the to-be-spliced image to a target image region in the target template image to obtain a target spliced image, wherein the target image portion and the target image region correspond to a same portion of the target object.

2. The method according to claim 1, wherein the matching degree comprises the average pixel difference between a pixel to which the mapped object feature point belongs and a pixel to which the to-be-spliced object feature point belongs,
wherein the preset matching condition comprises any one of:
the average pixel difference being the smallest among the plurality of template images; or
the average pixel difference being less than or equal to a preset pixel difference threshold.

3. The method according to claim 1, wherein the matching degree comprises the average distance between a pixel to which the mapped object feature point belongs and a pixel to which the to-be-spliced object feature point belongs,
wherein the preset matching condition comprises any one of:
the average distance being the smallest among the plurality of template images; or
the average distance being less than or equal to a preset distance threshold.

4. The method according to claim 1, wherein based on a splicing mask image corresponding to the target template image, splicing the target image portion in the to-be-spliced image to the target image region in the target template image to obtain the target spliced image comprises:
mapping the to-be-spliced image to the target template image to obtain a mapped target template image; and
based on a splicing mask image corresponding to the target template image, splicing a target image portion in the mapped target template image to the target image region in the target template image to obtain the target spliced image.

5. The method according to claim 4, wherein mapping the to-be-spliced image to the target template image to obtain the mapped target template image comprises:
calculating an optimal affine transformation invertible matrix from a target template object feature point of a target object in the target template image to a to-be-spliced object feature point of the target object in the to-be-spliced image; and
mapping the to-be-spliced image to the target template image according to the optimal affine transformation invertible matrix to obtain the mapped target template image.

6. The method according to claim 4, before splicing the target image portion in the to-be-spliced image to the target image region in the target template image to obtain the target spliced image, the method further comprising:
determining the target image region according to a target template object feature point; and
generating the splicing mask image according to the target image region.

7. The method according to claim 1, before acquiring the to-be-spliced image and the plurality of template images, the method further comprising:
acquiring a plurality of preset images; and
screening, from the plurality of preset images, the plurality of template images that satisfy a preset template condition,
wherein the preset template condition comprises at least one of: an image proportion of the target object being greater than or equal to a preset ratio threshold; an object angle of the target object being less than or equal to a preset angle threshold; or an object size of the target object being greater than or equal to a preset size threshold.

8. The method according to claim 1, wherein the target object comprises a face.

9. The method according to claim 1, wherein a plurality of target spliced images are provided,
wherein after splicing the target image portion in the to-be-spliced image to the target image region in the target template image to obtain the target spliced image, the method further comprises:
generating a target video according to a preset video template and the plurality of target spliced images.

10. An image splicing device, comprising:
a processor; and
a memory configured to store executable instructions,
wherein the processor is configured to read the executable instructions from the memory and execute the executable instructions to perform operations, wherein the operations comprise:
acquiring a to-be-spliced image and a plurality of template images, wherein the to-be-spliced image and each template image of the plurality of template images each comprise a target object;
based on an object feature point detection model obtained by pre-training, determining a to-be-spliced object feature point of the target object in the to-be-spliced image, and obtaining a template object feature point of the target object in the each template image;
for the each template image, calculating an optimal affine transformation matrix from the template object feature point to the to-be-spliced object feature point, and mapping the template object feature point to the to-be-spliced image according to the optimal affine transformation matrix to obtain a mapped object feature point;
based on an average pixel difference or an average distance between a pixel to which the mapped object feature point belongs and a pixel to which the to-be-spliced object feature point belongs, calculating a matching degree between the target object in the to-be-spliced image and the target object in the each template image;
determining a template image of the plurality of template images whose matching degree satisfies a preset matching condition as a target template image; and
based on a splicing mask image corresponding to the target template image, splicing a target image portion in the to-be-spliced image to a target image region in the target template image to obtain a target spliced image, wherein the target image portion and the target image region correspond to a same portion of the target object.

11. The device according to claim 10, wherein the matching degree comprises the average pixel difference between a pixel to which the mapped object feature point belongs and a pixel to which the to-be-spliced object feature point belongs,
wherein the preset matching condition comprises any one of:
the average pixel difference being the smallest among the plurality of template images; or
the average pixel difference being less than or equal to a preset pixel difference threshold.

12. The device according to claim 10, wherein the matching degree comprises the average distance between a pixel to which the mapped object feature point belongs and a pixel to which the to-be-spliced object feature point belongs,
wherein the preset matching condition comprises any one of:
the average distance being the smallest among the plurality of template images; or the average distance being less than or equal to a preset distance threshold.

13. The device according to claim 10, wherein based on a splicing mask image corresponding to the target template image, splicing the target image portion in the to-be-spliced image to the target image region in the target template image to obtain the target spliced image comprises:
mapping the to-be-spliced image to the target template image to obtain a mapped target template image; and
based on a splicing mask image corresponding to the target template image, splicing a target image portion in the mapped target template image to the target image region in the target template image to obtain the target spliced image.

14. The device according to claim 13, wherein mapping the to-be-spliced image to the target template image to obtain the mapped target template image comprises:
calculating an optimal affine transformation invertible matrix from a target template object feature point of a target object in the target template image to a to-be-spliced object feature point of the target object in the to-be-spliced image; and
mapping the to-be-spliced image to the target template image to obtain the mapped target template image according to the optimal affine transformation invertible matrix.

15. The device according to claim 13, before splicing the target image portion in the to-be-spliced image to the target image region in the target template image to obtain the target spliced image, the operations further comprising:
determining the target image region according to a target template object feature point; and
generating the splicing mask image according to the target image region.

16. The device according to claim 10, wherein the operations further comprise:
before acquiring the to-be-spliced image and the plurality of template images,
acquiring a plurality of preset images; and
screening, from the plurality of preset images, the plurality of template images that satisfy a preset template condition,
wherein the preset template condition comprises at least one of: an image proportion of the target object being greater than or equal to a preset ratio threshold; an object angle of the target object being less than or equal to a preset angle threshold; or an object size of the target object being greater than or equal to a preset size threshold.

17. The device according to claim 10, wherein the target object comprises a face.

18. The device according to claim 10, wherein a plurality of target spliced images are provided,
wherein the operations further comprise:
after splicing the target image portion in the to-be-spliced image to the target image region in the target template image to obtain the target spliced image, generating a target video according to a preset video template and the plurality of target spliced images.

19. A non-transitory computer-readable storage medium storing a computer program which, when executed by a processor, causes the processor to perform operations, wherein the operations comprise:
acquiring a to-be-spliced image and a plurality of template images, wherein the to-be-spliced image and each template image of the plurality of template images each comprise a target object;
based on an object feature point detection model obtained by pre-training, determining a to-be-spliced object feature point of the target object in the to-be-spliced image, and obtaining a template object feature point of the target object in the each template image;
for the each template image, calculating an optimal affine transformation matrix from the template object feature point to the to-be-spliced object feature point, and mapping the template object feature point to the to-be-spliced image according to the optimal affine transformation matrix to obtain a mapped object feature point;
based on an average pixel difference or an average distance between a pixel to which the mapped object feature point belongs and a pixel to which the to-be-spliced object feature point belongs, calculating a matching degree between the target object in the to-be-spliced image and the target object in the each template image;
determining a template image of the plurality of template images whose matching degree satisfies a preset matching condition as a target template image; and
based on a splicing mask image corresponding to the target template image, splicing a target image portion in the to-be-spliced image to a target image region in the target template image to obtain a target spliced image, wherein the target image portion and the target image region correspond to a same portion of the target object.

* * * * *